United States Patent [19]

Isono

[11] 4,157,217
[45] Jun. 5, 1979

[54] AUTOMATIC FOCUS ADJUSTING SYSTEM
[75] Inventor: Tadao Isono, Kokubunji, Japan
[73] Assignee: Nihon Beru-Haueru Kabushiki Kaisha, Higashimurayama, Japan
[21] Appl. No.: 871,726
[22] Filed: Jan. 23, 1978
[30] Foreign Application Priority Data Jan. 22, 1977 [JP] Japan .............................. 52/005405

[51] Int. Cl.² .......................... G03B 3/00; G03B 7/08
[52] U.S. Cl. ..................................... 354/25; 354/195; 352/140
[58] Field of Search .................. 354/25, 195; 352/140

[56] References Cited
U.S. PATENT DOCUMENTS 4,093,365  11/1978  Isono ..................................... 354/25

Primary Examiner—Russell E. Adams
Attorney, Agent, or Firm—Aaron Passman; Roger M. Fitz-Gerald

[57] ABSTRACT

Disclosed is an improvement in an automatic focusing system for use with an optical instrument having a focusable objective which is adjustable in response to optical and electronic components of the system for determining object distance of a remote subject by comparing images of scanning and reference optical systems. The scanner of the optical system is driven oscillatably across an angle to detect a subject between infinity and the minimum focus condition of the objective lens. The scanner is adjustable in response to the focus condition of the lens for alignment of the angle scanned with the subject when the lens is in perfect focus by means of an electronic and mechanical interconnecting feedback between the lens focusing ring and the aiming device for the scanning system.

The present invention relates to improvements in an automatic focusing system's for use with an optical instrument having a focusable objective. More particularly, the improvement relates to controlling the focusing system sensitivity in accordance with the various camera conditions which define depth of field e.g. object luminance, film sensitivity, shutter speed, focal length and the like.

7 Claims, 5 Drawing Figures

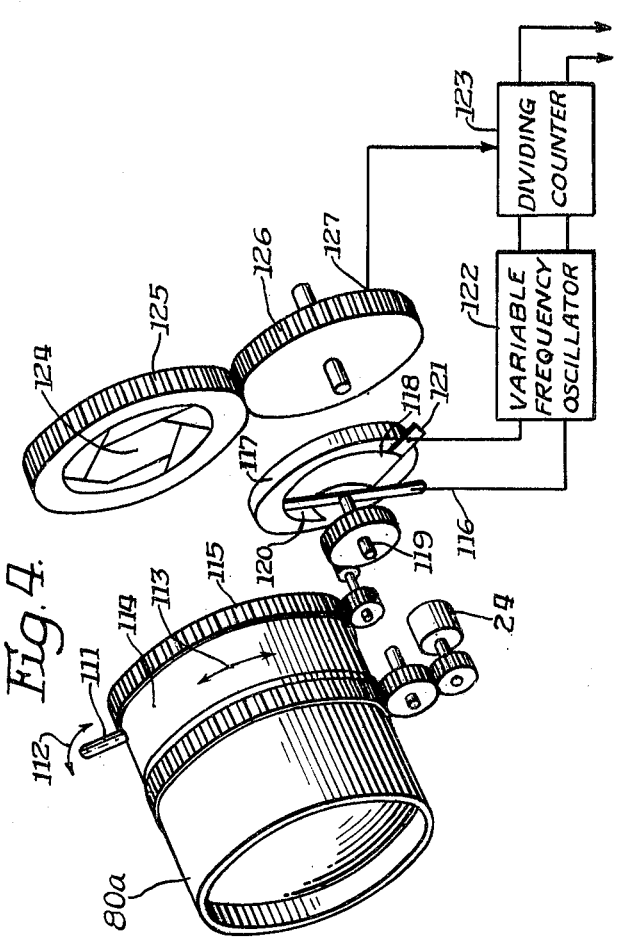
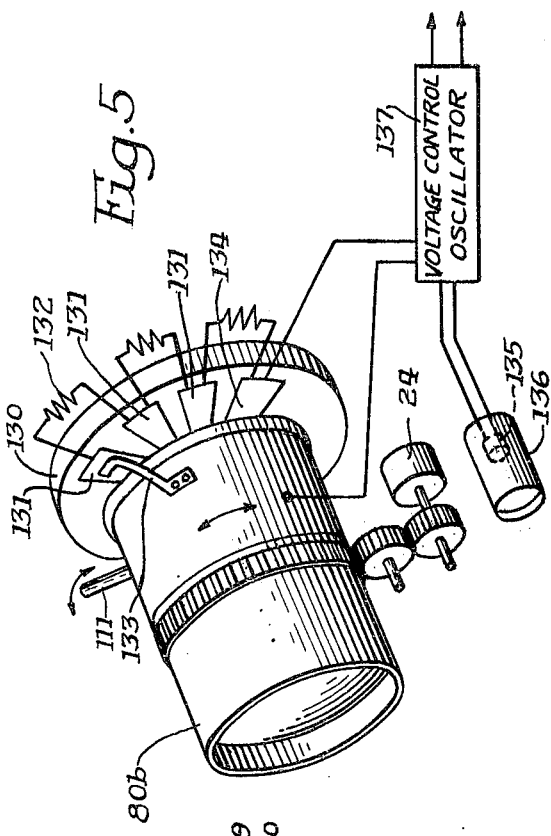
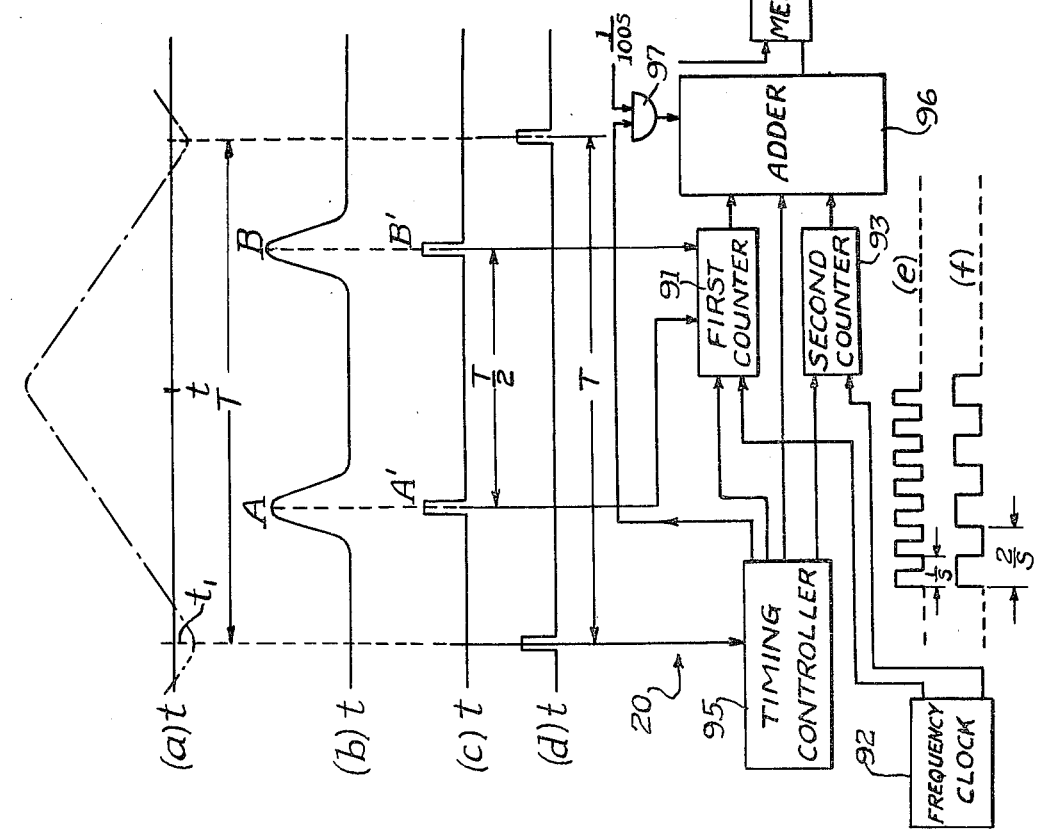

AUTOMATIC FOCUS ADJUSTING SYSTEM

BACKGROUND OF THE INVENTION

Improvements are being made continuously to optical instruments such as cameras having a focusable objective lens. One of the more recent series of improvements is an automatic focusing system for adjusting focus of the lens to an object distance corresponding to the distance of the camera to a remote subject in the field of view of that lens. Typically, an automatic focusing system may use the principle of spatial image correlation wherein a scene imaged by a first auxiliary optical system is scanned by a sensor and the image therefrom is correlated electronically by another sensor with an image from a fixed auxiliary optical system. Such an automatic focusing system has electronics for evaluating the light bundles from images passed through those optical systems and impinging on sensor arrays. Electronics are used to control power for a motor for driving the focusing cell of an objective lens in accordance with the relationship of the images transmitted by the optical systems. Focus of the objective lens occurs when the images from the optical systems are coincident; under such conditions the position of the scanning optical system is related to the position of the objective lens.

Certain of the automatic focusing systems, as described in recently issued United States patents, can be mass produced, are not unduly complex, bulky, and expensive, and are reliable for use in optical instruments or cameras for the mass market. Such systems include a scanning means, which moves an optical axis to sweep an image across a light sensitive array, and which is connected with another similar array of a distance detector. An automatic rangefinder of the type generally described in U.S. Pat. No. 4,002,899 assigned to Honeywell, Inc. and called the Honeywell Visitronics module responds to the two optical systems that bring light from the subject to a detector having a pair of photo sensitive arrays. The module is responsive to the fact that the axes of the optical system are aligned with one another and directed toward the same subject. Such alignment causes the detector to generate a peak pulse which pulse can be used to adjust the focus of the camera lens. One of the optical axes is fixed relative to the rangefinder and camera lens and the other is moveable so as to scan along the other optical axis. Rangefinding is accomplished by triangulation and comparison of the image from the fixed axis with the image from the scanning axis. By means of suitable electronic circuitry the peak signal can be converted to a control signal for the focusing motor.

SUMMARY OF THE INVENTION

According to the present invention, the focusing system is improved by adjusting the sensitivity and response of the electronic circuitry to the depth of field of the camera lens by an electro-mechanical interconnection between the camera lens; the iris and the electronic circuitry for focusing the lens. The desired lens position is determined by comparing the timing of two different signals. A first signal is provided by the already described optical systems and the second signal is provided by a lens position signaling device so that the difference between the former and the latter represents the focus adjustment necessary to set the objective lens. The circuitry herein includes counters which are started and stopped by each of the signals whereby the difference in the count represents the lens correction. The frequency of operation of the counters can be varied in accordance with camera parameters such that the relative depth of field (at any lens setting and with any film speed) sets the sensitivity of the automatic focus system, whereby the sensitivity will be diminished when the depth of field is great and conversely the sensitivity of the automatic focus system will be increased when the effective depth of field is small.

The interconnection between the lens setting and the sensitivity circuit is accomplished by means of variable resistances which are changed as the lens is adjusted for proper speed or the focal length is changed by zooming. The resistance is a function of the depth of field of the lens and iris settings. For example, in a movie camera zoom lens the focal length and the f-stop are variable and the auto focus system should be sufficiently sensitive and responsive so as to accurately set the focus. If the focus system were too sensitive in a high depth of field situation the corrections in focus would tend to change the scene size (zoom effect) more than is absolutely necessary. Therefore, it is desirable to make the minimum changes in focus adjustment to minimize hunting and overcorrection. The number of zones into which the distance from near to far focus must be divided for proper automatic focusing can be calculated as follows: Zones = $KF^2/Lf$ where, F is the focal length of the lens, f is the f stop setting of the lens, L is the closest distance to which the lens can be focused and K is a fixed value (constant) which is a function of the film and camera formats e.g. 8mm movie cameras have a K of 25. The focusing sensitivity is automatically adjusted in accordance with the number of zones needed to properly focus the lens such that there is low sensitivity (number of zones) when the depth of field is great and there is high sensitivity (number of zones) when the depth of field is small.

OBJECTS OF THE INVENTION

An object of the present invention is to provide an improved automatic focusing system which is sensitive to depth of field as proscribed by the camera lens focal length, iris setting and film speed.

Yet another object of the invention is to provide circuitry to electronically correlate the settings of the adjustable lens and iris for automatically setting the sensitivity of the automatic focus system.

BRIEF DESCRIPTION OF THE DRAWINGS

The above and other objects and advantages of the invention will become apparent from reference to the detailed specification and the accompanying drawings in which like numerals refer to like parts:

FIG. 3 is a series of time versus pulse diagrams which illustrate the nature of the focusing signal at various locations of the electronic circuit; and FIGS. 4 and 5 are perspective views of embodiments of the cooperating zoom lens and variable resistances which can set the sensitivity of the auto focus system.

DETAILED DESCRIPTION OF THE DRAWINGS

Figure 1:
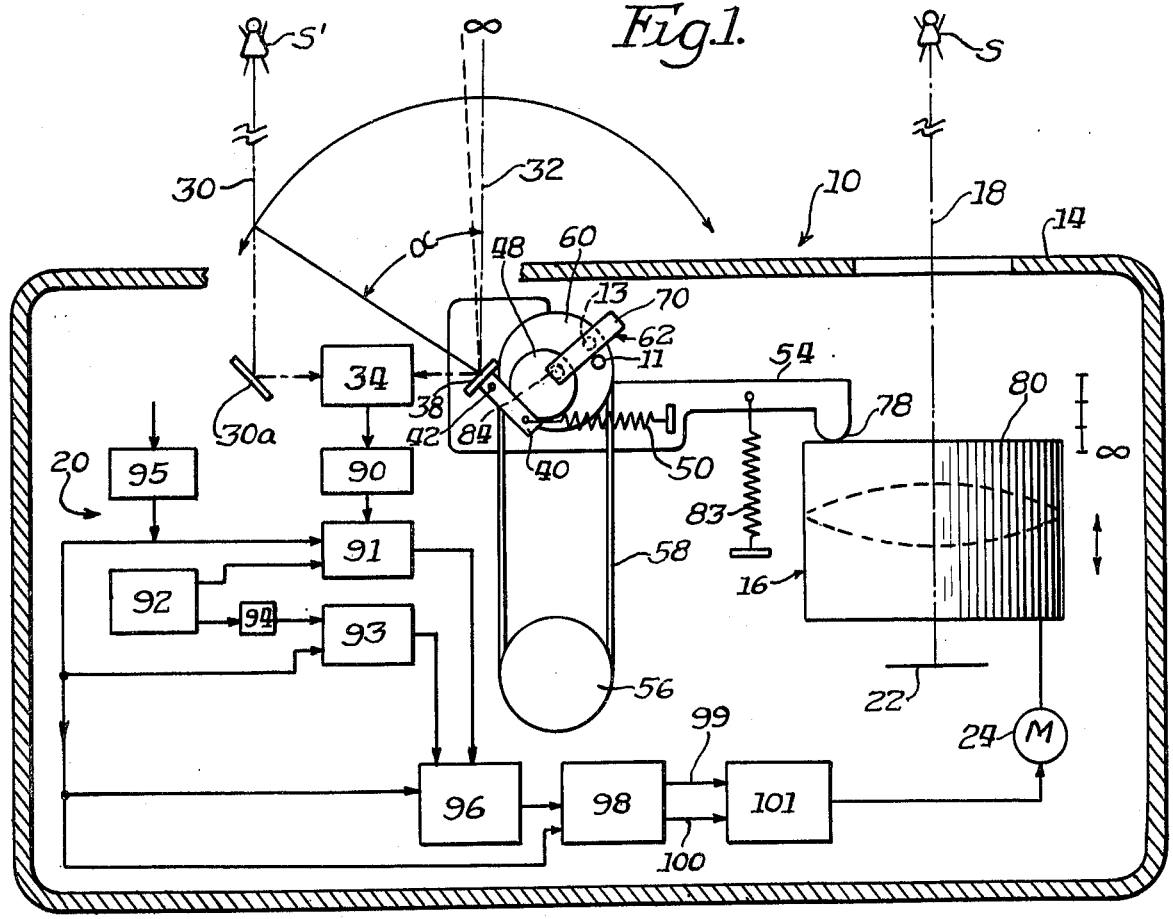
FIGS. 1 and 2 are schematic showings of a camera having an automatic focusing system for adjusting an objective lens with components in changed positions.

Referring now to FIG. 1, an optical instrument, such as a camera 10, is shown having a housing 14 which substantially encloses a focusable objective lens 16 defining an optical axis 18, and an automatic focusing system circuitry 20. The objective lens 16 or a focusing cell thereof is adjustable axially along the optical axis 18 for imaging of a remote subject S at given range of camera-to-subject or object distances onto an image plane 22 within the camera housing. The automatic focusing system is connected electrically to a drive motor 24 which is mechanically coupled to the objective lens 16 so that the position of the objective lens 16 is adjusted for focus at the object distance of the remote subject as determined by focusing system circuit 20.

Optically, the automatic focusing system includes a pair of optical systems 30, 32 which image light rays of the remote subject on a detector 34, such as the Honeywell Visitronics module. The first optical system 30 is oriented parallel with the optical axis of the objective lens 16 and functions to form on the detector a reference image of the subject S', which is the same as subject S. A mirror 30a is included in the first optical system 30 to direct incoming light to the module 34. The second optical system 32 is arranged a spaced distance from the first optical system, and includes a movable sensor or scanner shown as a mirror 38 which is movable to sweep the optical axis through an angle $\alpha$ (alpha). The sweep of the angle extends from an orientation substantially parallel with but intersecting the optical axis of the first optical system at a substantial object distance, to an angle intersecting the optical axis of the first optical system at an object distance substantially comparable to the minimum focusing distance of the objective lens 16. When the scanner is oriented to correspond to the object distance at which the objective lens is set, the arc or aspect of the sweep is divided on both sides (bisected) of a perpendicular to the surface of the scanner 38. As the scanner sweeps the field, the image of the second optical system 32 moves relative to the image of the first optical system 30. These optical systems image the light bundles on the light sensitive arrays of detector 34, to indicate the focus when images from the respective optical systems impinge on the detector arrays in coincidence.

Through circuitry 20 of the automatic focusing system the motor 24 for driving the objective lens 16 is selectively energized to adjust the position of the objective lens toward and from the image plane 22. This movement enables the object distance setting to be altered to focus the image of the subject S on the image plane 22 at various distances between infinity, a maximum focus condition and a minimum focus condition for the lens 16. Other circuitry controls energizing of a motor (not shown) for the scanner. Still other circuitry determines the position of the scanner member 38 for correlation with the orientation of the objective lens 16.

More particularly, the movable scanner 38 is supported by the scanner holder 40 which is pivoted about an axis 42. The scanner holder 40 is moved in an oscillating manner by a driven eccentric or cam 48 toward which a portion of the holder 40 is biassed into continuous engagement by a spring member 50 and which is attached at its other end to a base level member 54. Drive of the cam 48 is provided by a powered pulley 56 which is connected by a belt 58 to a pulley 60 to which the cam is either fastened in a known manner or may be formed integrally. The powered pulley 56 is drivable by a motor (not shown). The cam 48 is arranged eccentrically of the pulley 60 axis to cause the movable scanner member 38 to sweep through an angle $\alpha$ (alpha) during one half of each revolution of the pulley 60. This scanning angle is larger than the field of view and range of focus of the objective lens 16, and will detect subjects within the range of focus so that the object distance can be determined. Since the scanning angle is double the possible object angle, the subject will be located even at the extreme opposite ends of the scanner path. The bisector of the scanning angle can be aligned with the subject when the object of the objective lens 16 is adjusted to the distance.

Figure 2:
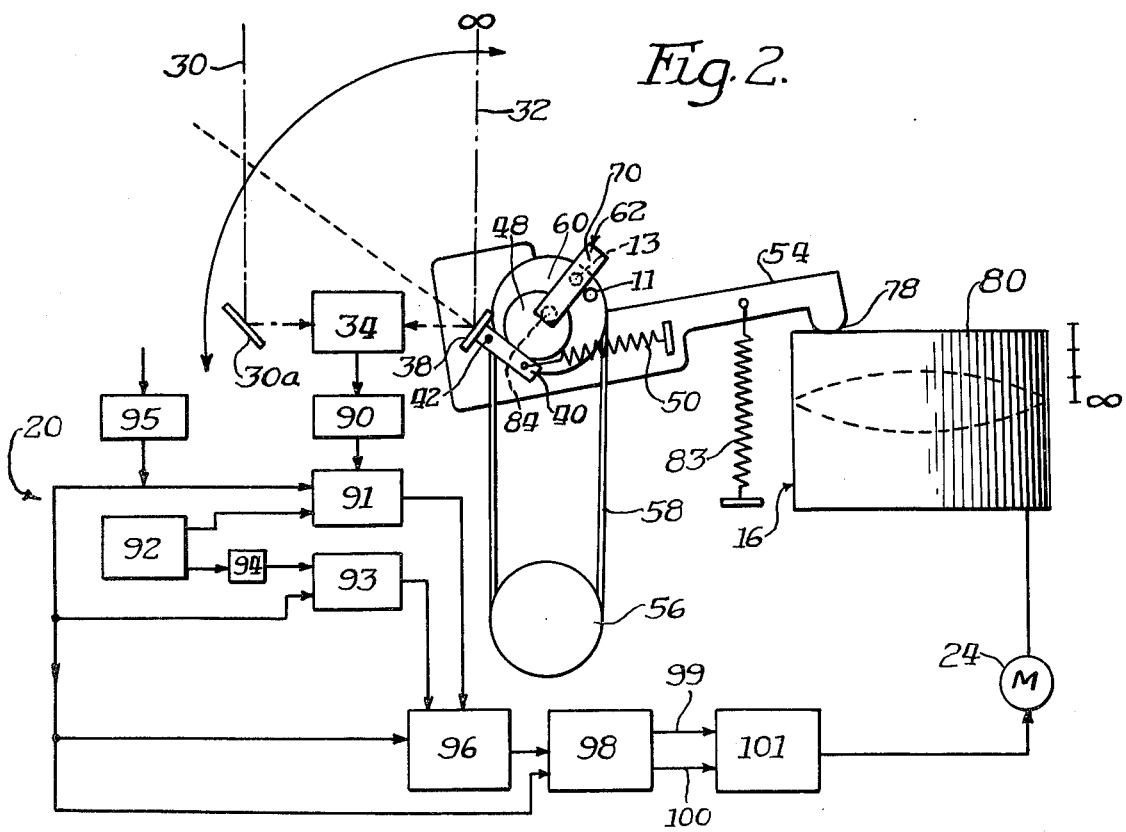

To correlate the position of the scanner 38 with an object distance, the pulley 60 is provided with a position indicator system 62 which enables a sensing system to relay information as to the position of the automatic focusing system. In the embodiment, as shown in FIGS. 1 and 2, the position indicator system 62 includes signal contacts 11 and 13 shown thereon. A frame 70 which is supported by a shaft 84 about which the pulley 60 is rotated supports contact 13 and contact 11 is carried on pulley 60. The scanner holder 40, the pulley 60, and the frame 70 are carried by the movable base lever member 54 which is rotatable about an axle arranged coaxially with the axis 84 around which the scanner support 40 moves. The position of the base lever member 54 and the components supported thereon is a function of the position of the objective lens 16.

A contact tip portion 78 of the base lever is biassed into engagement with a rim 80 of the objective lens by a spring member 83 fixed at its other end to the camera housing 14. As the objective lens is adjusted axially to an object distance for focusing of the image of a remote subject on the image plane 22, the rim 80 is adjusted in a corresponding manner. Through the contact member 78, the base lever rotates about an axis 84 thereby causing a change in the scanning aspect of the movable scanner. That is, the tip of the lever 54 can be formed so that the scanner is perpendicular to the subject when in a position corresponding to the focused condition of the objective lens 16, i.e. in the middle of its scanning arc as driven by the cam 48. Therefore, for example, when the objective lens 16 is adjusted to an object distance focus of five meters, the scanner sweeps an angle of $\alpha$ (alpha) degrees, respectively, in front of and behind the position of five meters.

In FIG. 2, the movable base lever 54 is shown rotated about the axis 84 in a counter clockwise direction from the orientation of FIG. 1. The scanner 38, the pulley 60, and other components supported on the base lever 54 are adjusted toward a minimum object distance condition. The scanning arc of the scanner is seen to sweep cyclically through a predetermined angle $\alpha$ (alpha), relative to the front and to the rear of the position of the minimum focus distances. The bracket 70 is movable about the axis 84 of the pulley 60. For each rotation of the pulley, pulses of current from contacts 11 and 13 are permitted to flow as the pulley rotates. The contacts 11 and 13 can be arranged with respect to the cam 48 so that each signal or pulse occurs when the movable scanner member 38 faces the position corresponding to the object distance setting of the objective lens 16. Correction of the relative positions of the components may be made by adjusting the positions of the bracket 70 about the axis 84.

Since the signal generator 62 is fixed to the pulley 60, and the scanner drive cam 48 is likewise fixed to the pulley 60, the orientation of the drive cam 48 and therefore of the scanner 38 is known. The scanner is "on-subject" at some condition of the cam. As the cam 48 and the signal generator 62 are relatively fixed together, the position of the scanner member 38 can be determined and translated into either electrical or other data output.

The coincident signal or peak pulse from the module 34 is directed along circuit 20 to generate a control signal for lens control motor 24. More specifically, the FIGS. 3(b) through (d) show the output at various points within the circuit 20 relative to the time for one revolution of cam 48. In FIG. 3(a) the locus of the scanning member 38, as it scans forward and returns through an angle of twice α (alpha), is shown. That is to say that, a complete scanning cycle for interval T is shown; the mid point represents movement of member 38 through an angle of α (alpha). On the forward scan cycle, the member 38 detects the subject S′ and a peak pulse A′ issues from module 34 in shown as FIG. 3(b). Upon the return scan cycle of member 38 the subject S′ is once again detected and another peak pulse B′ is transmitted by module 34. The spacing between pulses A′ and B′ is a function of the distance between the camera 10 and the subject S′ since the spacing is directly related to the angular positions of member 38 at which the subject S′ is sensed. FIG. 3(c) is representative of the pulses A′ and B′ as modified by the electronic wave shape forming circuit 90 which basically sharpens the pulse to accentuate the peak. Again, the spacing between A′ and B′ remains the same i.e. illustrating the relationship for subject distance to position of detection.

Referring to FIGS. 1 through 3, signals A′ and B′ are fed to first counter 91 which receives clocked pulses of frequency S shown at (e) in FIG. 3, said pulses being generated by clock generator 92. First counter 91 begins counting when pulse A′ occurs and stops counting when the pulse B′ occurs. Therefore, the time interval between the two signals which are generated during a full scanning cycle is counted as so many pulses and is stored in the first counter 91 as the number counted. Second counter 93 receives its signal from divider 94 which divides the clock pulses from clock generator 92 in half (in the preferred embodiment). The signals from divider 94 are pulses of half the frequency S of clock generator 92, see FIG. 3(f). Second counter 93 is controlled by the timing controller 95 which is controlled by the signal as shown in FIG. 3(d) generated by electric contacts 11 and 13. Second counter 93 stores the number or count of pulses (at the ½S clock frequency) as the input during a full scanning cycle T.

As explained previously, first counter 91 counts the time interval between two successive pulses from optical detector 34 at a clock frequency of S, and second counter 93 counts the time for the full scanning cycle at a frequency of ½S. Thus, one half of a full scanning time period T is established by the cycle counted. The difference between the point in time where a peak pulse is actually generated and the point where the next pulse should be generated after a time interval ½ T is obtainable within a tolerance of ±n counts (a function of frequency S; n being an integral number) by calculating the difference between two stored values of pulses counted. Actually the difference between the counts counted by counter 91 and 93 is determined through AND circuit by an adder 96 having a frequency of more than 100S per full cycle of timing pulses. The determined difference is fed to memory 98 as either a positive or negative signal (amount), and is therein retained for next full cycle for the timing pulses.

Therefore, the difference between two counts can be obtained from the outputs 99 and 100 of memory 98. A positive or negative signal (amount) can be obtained, which indicates the direction the lens 16 must be revolved. Memory 98 is connected to motor control circuit 101, and the signal from this circuit 101 drives the motor 24 which adjusts the focus of the lens 16. Logically, when the lens is in focus outputs 99 and 100 become zero, which means that the distance between A′ and B′ is equal to ½ T the time for a full scanning cycle.

In the automatic focus adjusting system constructed as explained above, the difference of counts between first counter 91 and second counter 93 is a function of clock frequency S (proportional), so as S is changed e.g. according to the zone number equation set forth, focusing sensitivity is adjustable. That is to say, S is low when the depth of field is great and precise focus adjustment is not needed, but S is high when precise focus adjustment is required.

An example of one embodiment, in the case of a movie camera with a full scanning cycle of scanner 38 of about 110 milliseconds, the difference of successive peak time between two signals is about 55 milliseconds. This difference in time is twice the scanning time necessary for the mirror 38 to scan from the closest distance to infinity, but the counting is done with a clock which divides milliseconds by at least Z (the number of zones). For a 45mm f/1.2 lens, L=1.5m and Z is 28, therefore 27/28=0.9 or clock time is about 0.9 milliseconds giving frequency S of about 110 cycle/second. If an f/8 lens is used S becomes 160 cycle/second.

When the f/8 lens is zoomed to a focal length of 10mm length, Z is 1.4, and S=50 cycle/second. If f/8 is used, and Z becomes 1, no focus adjustment is necessary, but in such a case the frequency S is preferably set at 40 cycle/second. The focus adjusting motor 24 is arranged for starting when the clock frequency is set as above and the difference between the counts becomes greater than 2. As another example, the focus adjusting motor 24 can be controlled proportionally by speed as a function of the magnitude of the number of counts. For instance, when the difference is 2, the speed is ¼, when 3, speed is ½, and when over 4, the motor 24 is driven at full speed.

Various devices can be used to change the clock frequency, as in the example shown in FIG. 4. Lens 80a has a zoom adjusting lever 111 moveable as shown by an arrow marked 112 and zoom adjusting ring 114 is moved per arrow marked 113. Gear portion 116 rotates with the movement of zoom adjusting ring 114 through gear portion 115 installed along edge of zooming adjusting ring 114. Gear portion 116 is by gearing connected to a round plate 117 on which a variable resistor 118 is mounted. Variable resistor 118 has different lengths relative to the axis of round plate 117, and is designed so that the resistance between a contact 120 on an axis 119 of gear portion 116, and a contact 121 on the end of variable resistor 118 is proportional to the square of the rotation of round plate 117. Contacts 120 and 121 are connected to a variable frequency oscillator 122 which is connected to dividing counter 123. When the iris 124 is stopped down digital decoder 126 is rotated by meshed engagement with a ring gear 125 carried by iris 124. Digital decoder 126 has many contacts whereby the rotating angle of iris 124 is converted to a digital value which is fed to dividing counter 123. In the device constructed as explained above the movement of lever 111 changes the focal length and the resistance between contacts 120 and 121 as set by the rotation of round plate 117 and changes the frequency of oscillator 122 proportionally to the square of the variable resistance. A low clock frequency is obtained from dividing counter 123 when the focal length is short, and a high clock frequency is obtained when focal length is long. The ratio of dividing is also changed according to the opening angle (or f stop) of iris 124 whereby small f numbers reduce the dividing giving a high clock frequency. Motor 24 is controlled with the clock frequency as explained, and the lens 80a is adjusted to focus with the necessary preciseness in accordance with the focal length and f-number.

A more simplified device is shown in FIG. 5, where rotatable range for focus adjustment is divided into several sections such as segments 131 on fixed round plate 130. These segments 131 are connected to each other through resistors or condensors 132. A contact 133 is arcuately slidable across segments 131 and is carried on the focus adjusting ring 114. The resistance between final segment 134 and ring 114 can preferably be used to set the frequency instead of using variable resistance. FIG. 5 has a technique for changing the frequency by a voltage control oscillator 137. This system works by detecting the object luminance with an object luminance detector 136 in which a cds element is used instead of the signal of the f stop change as shown in FIG. 4.

As explained in detail the focus sensitivity of the automatic focus adjusting device in this invention is not fixed but variable in accordance with the size of the depth of field and becomes highly sensitive when necessary and less sensitive when precise focus adjustment is not necessary, and moreover, this invention can prevent unnecessary change of scene-size during focus adjustment while taking movies. The depth of field of the system is used to adjust the sensitivity and response of the electronic circuit whereby the frequency and amount of automatic focus correction will be minimized consistent with the actual need therefore. In its broader aspects the improvement is as just explained and is as covered by the following claims.

What is claimed is:

1. For a camera having an adjustable exposure system, a focusable objective lens, a main lens with a variable focal length and an automatic focusing system including a scanner optical system having a scanner means and a reference optical system wherein images of a remote subject are caused respectively to impinge on a detector means, the detector means generating an output signal representing the object distance of the subject when the images on the detector are coincident, and including means to compare and relate the orientation of said scanner system and the focus condition of the objective lens and means to set the lens opening in accordance with the available light from the subject, the improvement in a means to adjust the focus of the objective lens to the object distance comprising:

reference means on said objective lens adjustable in response to variations in focus condition of said lens and for signaling the position of said lens, means supporting the scanner means for movement thereof, means on said scanner supporting means for engagement with said objective lens focus condition reference means for positioning of said supporting means in response to variations in said lens, scanner driver means for driving said scanner means oscillatably, electronic circuit means connected to said detector means and said reference means for periodically comparing the timing of said output signals therefrom and for issuing control signals relative to the position of the subject and the position of the range of said scanner oscillation, and means coupled to said variable main lens and said exposure system to vary the periodicity of said comparison in accordance with the effective focal length of said main lens and the opening of said adjustable exposure system to sensitive said automatic focus adjustment in accordance with the relative condition of depth of field of said camera.

2. The system of claim 1 wherein said electronic circuit means includes a clock adjustable to predetermined frequencies, a first counter connected to said clock for measuring and storing the number of clock beats between successive output signals from said detector, a second counter connected to said clock for measuring and storing the number of clock beats between successive output signals from said reference means and calculating means for determining the difference therebetween whereby said difference signal represents said control signal for focusing said objective lens.

3. The system of claim 2 wherein said means coupled to said variable main lens includes a variable resistance in circuit with said clock for changing the frequency thereof in response to the focal length of said main lens.

4. The system of claim 3 wherein said variable resistance varies proportionally to the square of the focal length of said main lens.

5. The system of claim 2 wherein said means coupled to said exposure system is a series of contacts in circuit with said clock for changing the frequency thereof in response to the relative position of the exposure setting of said camera.

6. An automatic focus adjusting apparatus for an optical device comprising:

a focusing lens means to sharpen the subject image at the film plane;

a scanning optical system for gathering light from predetermined portions of the field of view;

a reference optical system for gathering light from predetermined part of the field of view;

mechanical interconnecting means between said lens means and said scanning system for varying the field of scan in accordance with the position of said lens means;

detector means responsive to gathered light for emitting a series of signals, the timing of which is definitive of the distance from the aparatus to the subject;

a scanning system position indicating means associated with said scanning system for defining the direction of scan of said system by timed signals indicative of the period of the scan;

a clock means for counting at selectable predetermined frequencies in response to adjustments of said camera;

a first electronic circuitry for selective conversion of the timing of at least a successive pair of said detector signals to a measured number of counts representative of the distance of the subject from the apparatus;

a second electronic circuitry for selective conversion of the timing of at least a successive pair of said scanning system signals to a measured number of counts representative of the position and period of the scan; and comparison means connected to said first and second electronic circuits for measuring the difference in measured counts thereof and for issuing a lens means adjusting signal.

7. The system of claim 6 wherein the frequency of counting is a variable established by said adjustable clock responsive to the effective depth of field of said camera whereby the sensitivity and response of said automatic focusing system is minimized for conditions of high depth of field and maximized for conditions of low depth of field.

* * * * *